Dec. 10, 1940.  C. KELLER  2,224,544
TEMPERATURE CONTROL FOR TUBULAR GAS HEATERS
Filed Feb. 22, 1938  4 Sheets-Sheet 1

Dec. 10, 1940. C. KELLER 2,224,544
TEMPERATURE CONTROL FOR TUBULAR GAS HEATERS
Filed Feb. 22, 1938 4 Sheets-Sheet 2

Inventor
Curt Keller
by Michaelis & Michaelis
Attys

Dec. 10, 1940.  C. KELLER  2,224,544
TEMPERATURE CONTROL FOR TUBULAR GAS HEATERS
Filed Feb. 22, 1938    4 Sheets-Sheet 4

Inventor
Curt Keller
by Michaelis & Michaelis
Attys.

Patented Dec. 10, 1940

2,224,544

UNITED STATES PATENT OFFICE 2,224,544

TEMPERATURE CONTROL FOR TUBULAR GAS HEATERS

Curt Keller, Zurich, Switzerland, assignor to Aktiengesellschaft für Technische Studien, Zurich, Switzerland Application February 22, 1938, Serial No. 191,847
In Switzerland March 1, 1937

5 Claims. (Cl. 236—15)

This invention relates to tubular heaters for air and other permanent gases, and more particularly to arrangements for preventing overheating of the walls of the tubes of such heaters.

Arrangements of the type aforesaid are particularly useful, for example, in connection with hot-air engine plants, where the quantity of air to be heated at a point exposed to a supply of heat from an external source is subject to great fluctuations.

In the prior art, gas heaters have been disclosed where the combustion of the heating medium supplied takes place in a chamber, which is provided with an outer metal jacket and a lining of refractory material, preferably refractory bricks, on the inner side of such jacket. In order to protect this lining from being detrimentally influenced by the fire gases, part of the flue gases is returned into the furnace in a manner such that they form a cooling layer intermediate the gases of combustion and the walls of the furnace. In these gas heaters, however, the tubes, in which the air is to be heated, are not arranged directly in the furnace, but in a separate chamber into which pass the flue gases escaping from the furnace. This arrangement involves the drawback, that the temperature to which the gases are heated is limited, and that a larger heating surface is required than would be the case, if the heated tubes, or at least part thereof, were arranged directly in the furnace.

It is an object of the present invention to provide an arrangement of the type aforesaid which will prevent the temperature of the walls of the tubes of the heater from exceeding a predetermined maximum limit, even in the case of great and rapid variations in the load on the heater. This is especially important in tubular heaters for gases, as in this case a transgression of certain temperature limits endangers the tubes to a far greater extent than in those cases, where the tubes, while being exposed on one side to the flue gases, are wetted on the other side by a liquid or vapor, as e. g., in steam boilers or mercury boilers. Owing to the powerful cooling action of the liquid, the temperature of the tubes of such steam boilers deviates but little from that of the liquid to be heated, lying far below the temperature of the flue gases, whereby even greater temperature fluctuations in the furnace do not endanger the tubes. In the case of gas heaters, however, both sides of the tubes are in contact with gases only so that their temperature owing to the comparatively poor heat transmission, lies about midway between the temperature of the gas to be heated and that of the heating gas, i. e. with high temperatures of the furnace the temperature of the walls of the tubes is likewise high, so that, for example, already a slight rise of temperature in the furnace, when the inner gas temperature is constant, may become dangerous to the tubes. Thus fluctuations in the temperature of the furnace or the gases to be heated are followed to a great extent by the temperature of the walls of the tubes, whereby the tubes of such heaters are especially endangered unless the temperature of the walls is prevented from exceeding a predetermined maximum value.

The present invention provides a tubular gas heater of the kind in which at least part of the flue gases is returned into the furnace by means of a blower, with means for preventing the temperature of the walls of the tubes from exceeding a predetermined maximum value, in a manner such that at least one of the following factors: wall temperature of the heater tubes, temperature prevailing in the furnace, and the quantity of fuel supplied, automatically influences the quantity of the flue gases which are returned into the furnace. If, for example, in an arrangement of the aforenoted type more fuel is burnt than is required at a given moment, the amount of flue gases circulated is automatically increased correspondingly thus preventing an excessive rise of temperature in the furnace and a correspondingly excessive rise of temperature of the tube walls; conversely, if less fuel is burnt, the quantity of flue gases circulated is reduced. Thus, whereas in the prior art arrangements the quantity of flue gases returned to the furnace served the purpose of either protecting the refractory lining in the furnace from destruction, or to render the combustion step more effective so as to improve combustion. In the present case the flue gases returned to the furnace are intended to protect, against overheating, the walls of gas heater tubes, which are contacted on their inner and outer sides by gases only, one side being even exposed to the exceedingly hot fire gases, and which for this reason are particularly endangered by fluctuations in the load.

Preferably the factor controlling the quantity of flue gases circulated may influence the number of revolutions of the blower or, in the case that such blower has adjustable runner blades, by influencing the position of such blades. If the flue gases returned to the furnace are passed through a separate conduit, the factor controlling the quantity of flue gases circulated may influence an adjustable throttle member arranged in such conduit.

In the drawings affixed to the present specification and forming part thereof several embodiments of the invention are shown diagrammatically by way of example.

Figure 1:
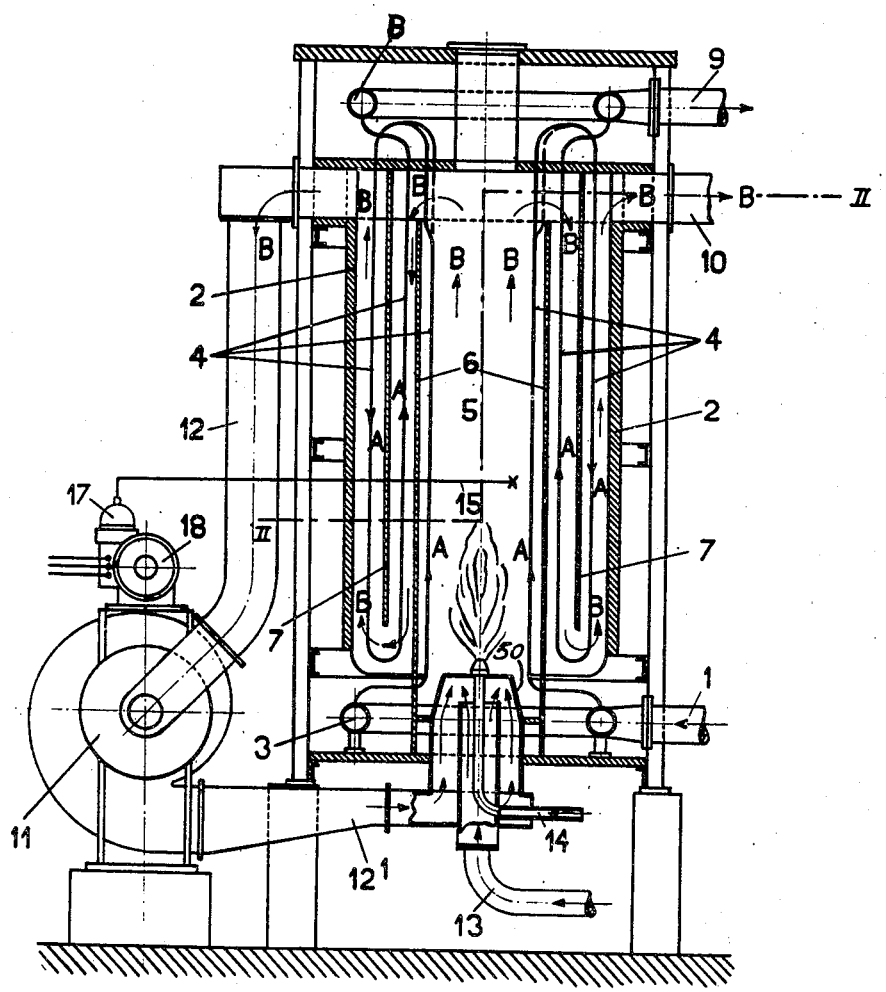
Fig. 1 illustrates, partly in longitudinal section, partly in side elevation, an air heater and a blower for the flue gases returned to the furnace of the air heater.
Figure 2:
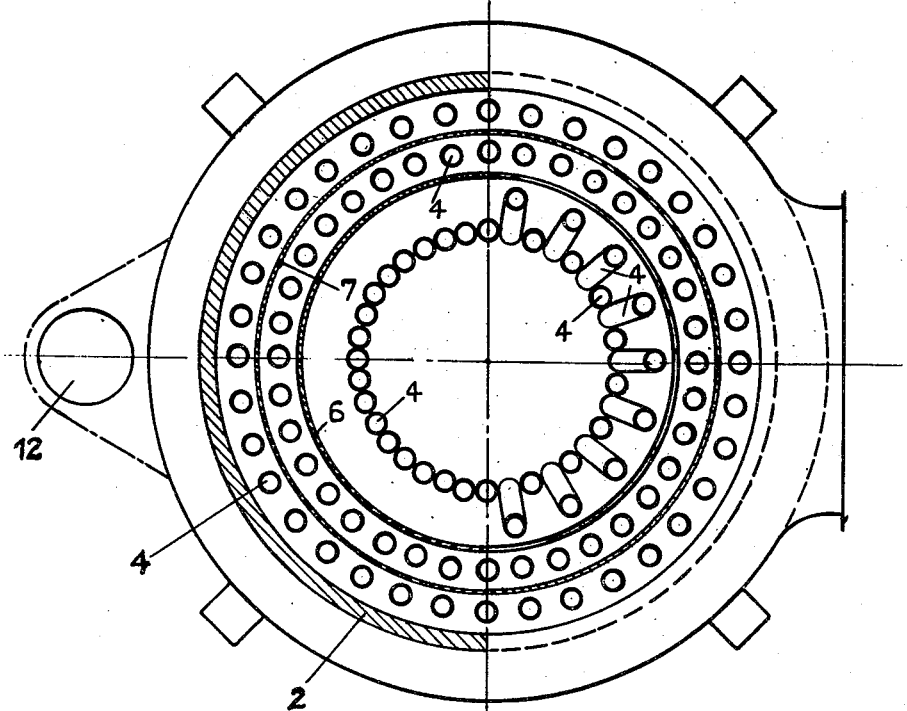
Fig. 2 is a cross-section on the line II—II.

Referring to the drawings, and first to Figs. 1 and 2, 1 is a conduit through which the air or gas to be heated is conveyed to the heater 2. The conduit 1 is connected to an annular distributing conduit 3 from which branch off a number of pipes 4, which extend through the heater 2 in the form of coils. As indicated in Fig. 2, the innermost sections of these pipes are in contact with each other almost throughout thus forming a cylinder lining the furnace 5 of the heater. As shown on the right hand side of Fig. 2, only in the uppermost part some of these pipe sections are so bent as to afford a passage for the escaping flue gases. The air to be heated passes through the pipes 4 in the direction of the arrows A, while the arrows B indicate the direction of flow of the fire or flue gases, which pass through the furnace 5 and the flues of the heater formed by the intermediate walls 6 and 7. The air heated in the pipes 4 is collected in an annular conduit 8, whence it passes through a conduit 9 to the consumption place. Part of the flue gases escapes through a conduit 10, while the remaining portion is sucked off by a blower 11 and returned to the furnace 5 through a duct 12, and a sleeve 50 surrounding the burners. Preferably, their entrance into the furnace 5 takes place with a whirling motion. A pipe 13 supplies fresh air required for the combustion, fuel is supplied by means of a pipe 14.

In the furnace 5 a thermo-couple 15 is operatively connected with a control arrangement influencing the electric current fed to the motor 18 driving the blower 11.

Figure 3:
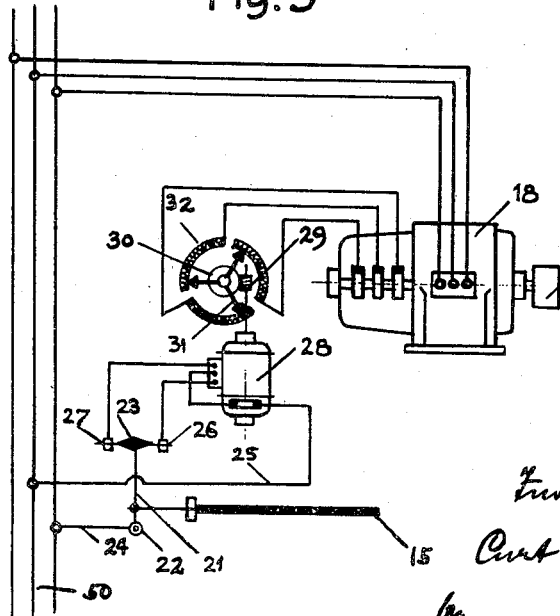
Fig. 3 illustrates diagrammatically a control arrangement which, in combination with a gas heater according to the invention, permits of controlling the number of revolutions of the engine driving the blower which returns the flue gases to the furnace, in dependency upon the temperature prevailing in the furnace.

Such a control arrangement shown in Fig. 3, comprises a lever 21 operatively connected with the thermo-couple 15, and pivotally supported at 22, being connected, by a wire 24, with a network 50. The lever 21 carries a contact member 23 arranged intermediate two further contact members 26 and 27, which are electrically connected with an auxiliary motor 28, which in turn is connected with the network 50 by a wire 25.

The auxiliary motor 28 may actuate, by means of a worm gear 29 and 30, a star contact 31, which cooperates with resistances 32, connected with the armature of the motor 18 driving the blower 11. Whenever the desired temperature in the furnace 5 is exceeded or not reached, the thermo-couple 15 causes the contact 23 to engage either contact 27 or contact 26, whereby the auxiliary motor 28 is caused to revolve in one or the other direction. In this manner it is possible to effect, with rising temperature in the furnace 5, an increase in the number of revolutions of the motor 18, so that the blower 11 returns more flue gases into the chamber 5 and consequently more of such gases is admixed with the comparatively fresh, hot gases of combustion. Thus an effective reduction in the temperature in the furnace 5 is quickly obtained so as to protect the walls of the pipes 4 against the action of any excessive temperatures. If, however, the temperature in the furnace 5 drops below the desired value, the thermo-couple 15 effects, by means of the control arrangement above referred to, a reduction of the number of revolutions of the blower 11 in a manner such that a smaller quantity of flue gases is returned through the conduit $12^1$ to the furnace 5 and consequently the temperature of the fresh flue gases is lowered to a smaller extent by the returned flue gases. Since it is possible to provide thermo-couples which operate substantially free from any inertia, the afore-noted arrangement renders it possible to instantaneously adjust, in dependency upon the temperature prevailing in the furnace 5, the quantity of flue gases circulated by the blower 11 so as to perfectly control the temperature in the furnace.

Figure 4:
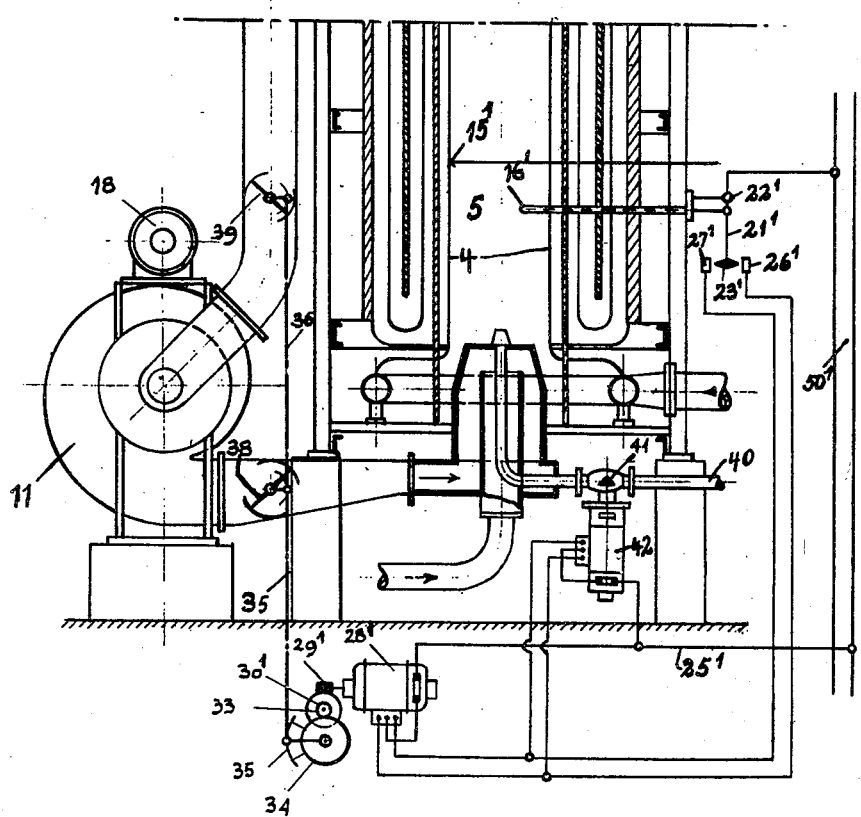
Fig. 4 illustrates a modification of the invention shown in Fig. 1 wherein the furnace temperature influences a control member provided in the fuel supply conduit, as well as throttling means arranged in the suction and pressure conduits of the blower.

As shown in Fig. 4, the quantity of flue gases to be returned to the furnace by means of the blower, may just as well be controlled in dependency upon the temperature of the walls of the heater tubes and, in particular, of that portion of these tubes which is located in the furnace, by arranging the thermo-couple $15^1$ in contact with the tube walls, instead of providing the same in the furnace at a point remote from such walls. In this case the thermo-couple may control the blower returning part of the flue gases to the furnace in the same manner as described above with reference to Figs. 1–3.

As further illustrated in Fig. 4, the quantity of flue gases returned to the furnace 5 may be coupled with the amount of fuel supplied to the furnace, so as to control both these factors by the temperature prevailing in the furnace 5. As shown in Fig. 4, the means for controlling the quantity of flue gases returned to the furnace 5 may be modified so as not to influence the number of revolutions of the motor driving the blower, as described above with reference to Figs. 1–3, but to influence the position of throttle valves arranged, for example, in both the suction and pressure conduits of the blower 11. In Fig. 4, $16^1$ is a thermo-couple controlled by the temperature prevailing in the furnace 5, which actuates a lever $21^1$. This lever is pivotally mounted at $22^1$ and is electrically connected, at its pivot point, with the network $50^1$. The lever $21^1$ further carries a contact $23^1$ which is arranged intermediate two further contacts $26^1$ and $27^1$, which in turn are electrically connected with an auxiliary motor $28^1$. The motor $28^1$ is connected with the network $50^1$ by means of a conductor $25^1$. Furthermore, the auxiliary motor $28^1$, by means of a worm and spur gear $29^1$, $30^1$, 34, may actuate lever rods 35 and 36, which in turn are operatively connected with two throttle valves 38 and 39, valve 38 being arranged in the pressure conduit, while valve 39 is arranged in the suction conduit of the blower. The wires connecting the contacts $26^1$ and $27^1$ with the auxiliary motor $28^1$, as well as the wire $25^1$ connecting the motor $28^1$ with the network $50^1$, are connected to a further auxiliary motor 42, which controls the condition of a valve 41 arranged in the fuel supply conduit 40.

When the desired furnace temperature 5 is exceeded or understepped, the contact $23^1$ engages either the contact $27^1$ or the contact $26^1$, whereby the auxiliary motors $28^1$ and 42 are so operated, and the control members 38, 39 or 41, influenced by the said motors, are so adjusted, that the quantity of flue gases returned to the furnace 5 and the amount of fuel supplied to the furnace 5 restore the desired furnace temperature.

Obviously thermo-couple $15^1$ could be used in the control system of Fig. 4 instead of thermo-couple $16^1$.

If desired, one of the throttle valves in the suction and pressure conduits of the blower may be dispensed with, so that only a single throttle is provided either in the suction or in the pressure conduit, the operation of this valve being the same as described above with respect to the twin valve structure.

Figure 5:
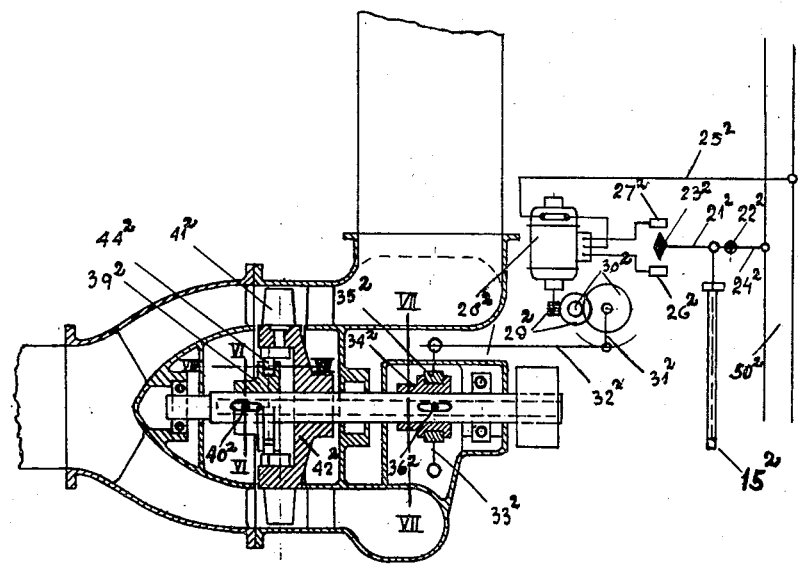
Fig. 5 shows an axial longitudinal section of a blower comprising adjustable runner blades, and a turbine member controlling the position of such blades.
Figure 6:
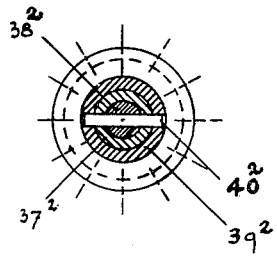
Figs. 6, 7 and 8 are cross-sections, drawn to a larger scale, along the lines VI—VI, VII—VII, and VIII—VIII, respectively, of Fig. 5.
Figure 7:
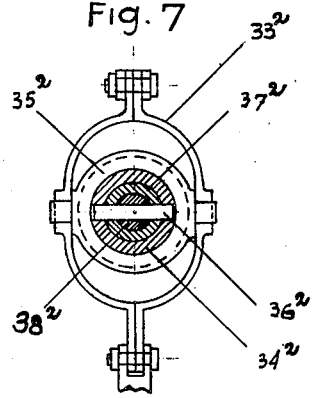
Figure 8:
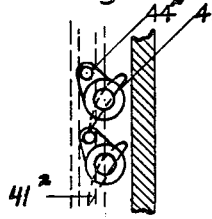

If the blower circulating the flue gases is provided with adjustable runner blades, the factor or factors controlling the quantity of flue gases circulated may effect such control by influencing the position of such runner blades. Such an arrangement is shown in Figs. 5–8. The thermo-couple $15^2$ shown in Fig. 5 is influenced by the temperature in the furnace of a tubular heater which may correspond e. g. to those indicated in Figs. 1 and 4. In a manner similar to that described above in connection with Figs. 3 and 4, also in this case the thermo-couple $15^2$ coacts with a lever $21^2$ which is pivotally mounted at $22^2$ and is connected, through a wire $24^2$, to a network $50^2$. The lever $21^2$ carries a contact $23^2$, which arranged intermediate two further contacts $26^2$ and $27^2$ connected with an auxiliary motor $28^2$, which cooperates with a lever $31^2$ through a worm and spur gear $29^2$, $30^2$. The lever $31^2$ is linked to a rod $32^2$, which in turn is connected with a forked lever $33^2$, which carries a ring $35^2$ guided in a displaceable box $34^2$. This box $34^2$ is connected, by means of a bolt $36^2$, with a rod $38^2$ arranged for displacement in a hollow shaft $37^2$.

A movement of the box $34^2$ is transmitted, by means of the rod $38^2$ and a bolt $40^2$, to a disk $39^2$ mounted in the blower hub $42^2$ and provided with annular grooves. The runner blades $41^2$ of the blower are arranged for rotation. Each of these blades $41^2$ is provided, on its inner end, with a link $43^2$ which carries a journal $44^2$. The journals $44^2$ project into an annular groove of the disk $39^2$ so that a displacement of this disk $39^2$ causes a corresponding displacement of the blades $41^2$. Whenever the desired temperature in the furnace is exceeded or understepped, the thermo-couple $15^2$ causes the auxiliary motor $28^2$ to revolve in one or the other direction so as to effect a corresponding displacement of the blades $41^2$, whereby the quantity of flue gases circulated by the blower is adjusted corresponding to the position of the blades.

The thermo-couple $15^2$ could be made responsive to the temperature of the tube walls instead of the furnace temperature.

Obviously, the various control arrangements described above may be employed separately, in dependency upon one or several of the factors referred to above; or else, several or all of these control arrangements may be combined if desired.

I wish it to be understood that I do not desire to be limited to the exact details of construction shown and described for obvious modifications will occur to a person skilled in the art.

I claim:

1. The combination, with the combustion chamber of a tubular gas heater, of axially extending gas heater tubes arranged in a closed curve so as to surround and delimit on all sides the central part of said chamber, conveying means for returning gaseous products of combustion into said central part, means for forming such returned combustion products into a protective gas veil of closed-curve cross-section enveloping the flame and furnace combustion gases and separating said tubes from said flame and gases, and means responsive to the temperature of the tube walls for automatically controlling the quantity of flue gases so returned.

2. The heater of claim 1, in which the means for returning the flue gases is a blower and the automatic controlling means are arranged to vary the performance of said blower.

3. The heater of claim 1, in which the means for returning the flue gases is a blower and the automatic controlling means are arranged to vary the number of revolutions of said blower.

4. The heater of claim 1, in which the means for returning the flue gases is a blower with adjustable vanes and the automatic controlling means are arranged to vary the position of said blower vanes.

5. The heater of claim 1, in which the means for returning the flue gases is a blower, a throttle being arranged in the path of the gases conveyed by said blower and the automatic controlling means being arranged to vary the throttling effect of said throttle.

CURT KELLER.